US 7,092,722 B1

(12) United States Patent
Oh et al.

(10) Patent No.: US 7,092,722 B1
(45) Date of Patent: Aug. 15, 2006

(54) METHOD AND SYSTEM FOR ESTABLISHING MOBILE STATION ACTIVE SET BASED ON MOBILE STATION LOCATION

(75) Inventors: Dae-Sik Oh, Overland Park, KS (US); Leo Ray Anderson, Jr., Kansas City, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 668 days.

(21) Appl. No.: 09/915,731

(22) Filed: Jul. 26, 2001

(51) Int. Cl.
*H04Q 7/20* (2006.01)
(52) U.S. Cl. .............. 455/456.1; 455/456.2; 455/456.3; 455/456.5; 455/456.6; 370/331; 370/332; 370/342
(58) Field of Classification Search ............ 455/442, 455/436, 33.2–33.4, 51.1, 456, 437, 438, 455/439, 440, 444, 457, 139, 441, 443, 456.1; 379/60, 59; 370/331, 375, 342, 333, 336
See application file for complete search history.

(56) References Cited

U.S. PATENT DOCUMENTS

| 4,765,753 | A | | 8/1988 | Schmidt |
|---|---|---|---|---|
| 5,392,331 | A | | 2/1995 | Patsiokas et al. |
| 5,434,950 | A | * | 7/1995 | Kaallman .................... 706/20 |
| 5,459,759 | A | | 10/1995 | Schilling |
| 5,508,708 | A | | 4/1996 | Ghosh et al. |
| 5,513,246 | A | * | 4/1996 | Jonsson et al. ............. 455/443 |
| 5,539,744 | A | | 7/1996 | Chu et al. |
| 5,640,676 | A | * | 6/1997 | Garncarz et al. ........... 455/436 |
| 5,650,770 | A | | 7/1997 | Schlager et al. |
| RE35,916 | E | | 10/1998 | Dennison et al. |
| 5,901,354 | A | | 5/1999 | Menich et al. |
| 5,963,130 | A | | 10/1999 | Schlager et al. |
| 6,026,301 | A | * | 2/2000 | Satarasinghe ............... 455/436 |
| 6,075,989 | A | | 6/2000 | Moore et al. |
| 6,088,594 | A | | 7/2000 | Kingdon et al. |
| 6,151,498 | A | | 11/2000 | Roel-Ng et al. |
| 6,195,342 | B1 | * | 2/2001 | Rohani ....................... 370/331 |
| 6,198,390 | B1 | | 3/2001 | Schlager et al. |
| 6,321,090 | B1 | * | 11/2001 | Soliman ..................... 455/440 |
| 6,324,404 | B1 | | 11/2001 | Dennison et al. |
| 6,351,642 | B1 | * | 2/2002 | Corbett et al. ............. 455/442 |
| 6,360,098 | B1 | | 3/2002 | Ganesh et al. |
| 6,363,255 | B1 | | 3/2002 | Kuwahara |
| 6,449,305 | B1 | * | 9/2002 | Menich et al. ............. 375/141 |
| 6,473,619 | B1 | | 10/2002 | Kong et al. |
| 6,498,785 | B1 | * | 12/2002 | Derryberry et al. ........ 370/311 |
| 6,522,888 | B1 | | 2/2003 | Garceran et al. |

(Continued)

OTHER PUBLICATIONS

Akyildiz, Ian F., "Mobility Management in Next-Generation Wireless Systems," Proceedings of the IEEE, vol. 87, No. 8, pp. 1347-1384, Aug. 1999.

(Continued)

*Primary Examiner*—Joseph Feild
*Assistant Examiner*—Julio Perez (57) ABSTRACT

A method and system for selecting a mobile station active set based, at least in part, on the geographic location of the mobile station. A base station or other entity monitors the mobile station's location. When the location changes, the base station refers to a predefined sector-coverage database to identify as the active set one or more sectors that each encompass the mobile station's location. If more than one sector encompasses the location, the base station may further select as the active set a subset of one or more sectors to which the mobile station is closest.

14 Claims, 6 Drawing Sheets

U.S. PATENT DOCUMENTS

| | | | |
|---|---|---|---|
| 6,549,781 B1* | 4/2003 | O'Byrne et al. | 455/446 |
| 6,570,862 B1* | 5/2003 | Virtanen | 370/335 |
| 6,594,253 B1* | 7/2003 | Sallberg et al. | 370/349 |
| 6,597,906 B1 | 7/2003 | Van Leeuwen et al. | |
| 6,631,263 B1 | 10/2003 | Corkery | |
| 6,667,962 B1* | 12/2003 | Lee et al. | 370/335 |
| 6,714,789 B1 | 3/2004 | Oh et al. | |
| 6,731,622 B1* | 5/2004 | Frank et al. | 370/342 |
| 6,934,546 B1* | 8/2005 | Corbett et al. | 455/441 |
| 2002/0027889 A1* | 3/2002 | Yun et al. | 370/331 |
| 2002/0102976 A1* | 8/2002 | Newbury et al. | 455/436 |
| 2002/0198004 A1* | 12/2002 | Heie et al. | 455/456 |
| 2003/0017831 A1* | 1/2003 | Lee et al. | 455/453 |
| 2003/0017837 A1* | 1/2003 | Kalliojarvi | 455/522 |
| 2004/0203780 A1* | 10/2004 | Julka et al. | 455/436 |

OTHER PUBLICATIONS

Angus, Allan, "ReFLEX™ & IEEE 802.11—How ReFLEX NPCS Networks Can Make Wi-Fi Better," http://www.braddye.com/ReFLEX_802_4s.pdf, Printed from the World Wide Web on Jan. 23, 2004.

Angus, Allan, "ReFLEX™ & IEEE 802.11—How ReFLEX NPCS Networks Can Make Wi-Fi Better," Printed from the World Wide Web on Oct. 28, 2003.

Garg, Vijay K., et al., "Applications of CDMA in Wireless/Personal Communications," Prentice Hall PTR, Chapter 13, pp. 334-336, 1997.

La Porta, Thomas F., et al., "Comparison of Signaling Loads for PCS Systems," http://citeseer.nj.nec.com/cache/papers/cs/11341/http:zSzzSzwww.bell-labs.comzSzuserzSztlpzSzpcs_ld.fm.pdf/porta95comparison.pdf, Printed from the World Wide Web on Oct. 28, 2003.

Lin, Yi-Bing, "Comparing Soft and Hard Handoffs," http://citeseer.nj.nec.com/cache/papers/cs/8464/http:zSzzSzliny.csie.nctu.edu.twzSztvt97c.pdf/submitted-to-ieee-trans.pdf, Printed from the World Wide Web on Oct. 28, 2003.

Ramjee, Ramachandran, et al., "Performance Evaluation of Connection Rerouting Schemes for ATM-Based Wireless Networks," IEEE/ACM Transactions on Networking, vol. 6, No. 3, pp. 249-261, Jun. 1998.

Ramjee, Ramachandran, "Supporting Connection Mobility in Wireless Networks," Dissertation submitted to the Graduate School of the University of Massachusetts Amherst in partial fulfillment of the requirements for the degree of Doctor of Philosophy, pp. 1-154, May 1997.

Trotter, John and Cravatts, Mark, "A Wireless Adapter Architecture for Mobile Computing," http://www.usenix.org/publications/library/proceedings/mob95/full_papers/trotter.txt, Printed from the World Wide Web on Oct. 28, 2003.

Oh, Jongtaek, "5. CDMA..", http://edu.hansung.ac.kr/~jtoh/mobile/ch5.ppt, Printed from the World Wide Web on Dec. 16, 2003.

Das, Suman, et al., "Dynamic Load Balancing Through Coordinated Scheduling in Packet Data Systems", http://www.ieee-infocom.org/2003/papers/19_04.PDF, Printed from the World Wide Web on Dec. 16, 2003.

Bedell, Paul, a reference excerpt taken from the book titled "Cellular/PCS Management: A Real World Perspective", http://www.privateline.com/Cellbasics/CDMAmanage.pdf, Printed from the World Wide Web on Oct. 28, 2003.

Office Action from U.S. Appl. No. 09/664,292, dated Jan. 30, 2003.

Office Action from U.S. Appl. No. 09/664,292, dated Jul. 16, 2003.

* cited by examiner

METHOD AND SYSTEM FOR ESTABLISHING MOBILE STATION ACTIVE SET BASED ON MOBILE STATION LOCATION

BACKGROUND

1. Field of the Invention

The present invention relates to wireless telecommunications and, more particularly, to methods and systems for determining which sector or sectors in a cellular wireless network should serve a given mobile station. The invention conveniently uses the location of the mobile station as a basis to select one or more sectors that should be considered members of the mobile station's "active" set of sectors.

2. Description of Related Art

Cellular wireless is an increasingly popular means of personal communication in the modern world. People are using cellular wireless networks for the exchange of voice and data over cellular telephones, Personal Digital Assistants ("PDAs"), cellular telephone modems, and other devices. In principle, a user can seek information over the Internet or call anyone over a Public Switched Telephone Network ("PSTN") from any place inside the coverage area of the cellular wireless network.

In a typical cellular wireless system, an area is divided geographically into a number of cell sites, each defined by a radio frequency ("RF") radiation pattern from a respective base transceiver station ("BTS") antenna. The BTS antennae in the cells are in turn coupled to a base station controller ("BSC"), which is then coupled to a telecommunications switch or gateway, such as a mobile switching center ("MSC") for instance. The MSC or gateway may then be coupled to a telecommunications network such as the PSTN (public switched telephone network) or the Internet.

When a mobile station (such as a cellular telephone, pager, or appropriately equipped portable computer, for instance) is positioned in a cell, the mobile station communicates via an RF air interface with the BTS antenna of the cell. Consequently, a communication path is established between the mobile station and the telecommunications network, via the air interface, the BTS, the BSC and the MSC.

With the explosive growth in demand for wireless communications, the level of call traffic in most cell sites has increased drastically over recent years. To help manage the call traffic, most cells in a wireless network are usually further divided geographically into a number of sectors (which can be visualized ideally as pie pieces), each defined respectively by radiation patterns from directional antenna components of the respective BTS, or by respective BTS antennae.

In a Code Division Multiple Access ("CDMA") wireless network, each cell employs one or more carrier frequencies, and each sector is distinguished from adjacent physical sectors by a pseudo-random number offset ("PN offset"). Further, each sector can concurrently communicate on multiple different channels, distinguished by "Walsh codes". When a mobile station operates in a given sector, communications between the mobile station and the BTS of the sector are carried on a given frequency and are encoded by the sector's PN offset and a given Walsh code.

According to industry standard IS-2000 (published in March 2000 as TIA/EIA/IS-2000-A) and IS-95, a mobile station can communicate with a number of "active" sectors at a time. Depending on the system, the number of active sectors can be up to three or six (currently). The mobile station receives largely the same signal from each of the active sectors and, on a frame-by-frame basis, selects the best signal to use.

A mobile station maintains in its memory a list of the sectors in its "active" set. In addition, it maintains in its memory a list of "candidate" sectors (up to six), which are those sectors that are not yet in the active set but that have sufficient signal strength that the mobile station could demodulate signals from those sectors. Further, the mobile maintains a list of "neighbor" sectors, which are those sectors not in the active set or candidate set but are in close vicinity to the mobile station. All other possible sectors are members of a "remaining" set.

In existing systems, to facilitate a determination of which sectors should be in the mobile station's "active" set, all base stations emit a pilot channel signal, typically at a power level higher than other downlink signals. A mobile station then constantly measures the strength ($E_c/I_o$, i.e., energy versus spectral density) of each pilot that it receives and notifies a primary base station (a base station currently serving the mobile station) when pilot strength falls above or below designated thresholds. The base station, in turn, provides the mobile station with an updated list of active pilots.

More particularly, according to IS-2000, the base station initially provides the mobile station with a Handoff Direction Message (HDM), which indicates (i) the PN offsets of the sectors in the active set and (ii) the following handoff parameters that relate to pilot signal strength:

T_ADD: Threshold pilot strength for addition to the active set (e.g., −14 dB)

T_COMP: Difference in signal strength from an active set pilot (e.g., 2 dB)

T_DROP: Threshold pilot strength for removal from the active set (e.g., −16 dB)

T_TDROP: Time for which an active set pilot falls below T_DROP to justify removal from the active set (e.g., 2 seconds)

Additionally, the base station initially provides the mobile station with a Neighbor List Update Message (NLUM), which identifies the "neighbor" sectors for the current active set.

The mobile station then monitors all of the pilot signals that it receives, and the mobile station determines if any neighbor pilot exceeds T_ADD by T_COMP. If so, the mobile station adds the pilot to its "candidate" set and sends a Pilot Strength Measurement Message (PSMM) to the base station, indicating the estimated $E_c/I_o$ for the pilot. Depending on current capacity and other issues, the base station may then send an HDM to the mobile station, listing the pilot as a new member of the active set. Upon receipt of the HDM, the mobile station then adds the pilot to its active set as instructed, and the mobile station sends a Handoff Completion Message (HCM) to the base station, acknowledging the instruction, and providing a list of the pilots (PN offsets) in its active set.

Similarly, if the mobile station detects that the signal strength of a pilot in its active set drops below T_DROP, the mobile station starts a handoff drop timer. If T_TDROP passes, the mobile station then sends a PSMM to the base station, indicating the $E_c/I_o$ and drop timer. The base station may then respond by sending an HDM to the mobile station, without the pilot in the active set. The mobile station would then receive the HDM and responsively move the pilot to its neighbor set and send an HCM to the base station.

SUMMARY

A problem with this existing arrangement is that, when a mobile station has several sectors in its active set, the base stations of all of the active sectors need to concurrently serve the mobile station. For instance, if the mobile station has three or six sectors in its active set and is involved in a call, the base stations of all three or six sectors need to communicate on respective traffic channels with the mobile station, all sending and receiving the same traffic signals. At any given moment, however, the mobile station need not be served by so many sectors. Therefore, with the existing procedures, the end result may be an unnecessary use of base station and air interface resources.

The present invention provides a mechanism to help reduce the burden on base stations and other system resources. According to an exemplary embodiment of the invention, a cellular wireless system will employ location technology to determine the position of a mobile station, and the system will then use the position of the mobile station as a basis to determine which sector or sectors should be in the mobile station's active set. The invention does not necessarily preclude use of existing methods as well.

In accordance with the exemplary embodiment, a cellular wireless system will maintain a database or other data store that indicates the geographic positions (e.g., latitude-longitude coordinates, also known as "geo-codes") covered by each sector. A base station controller can then continuously monitor the position of a mobile station and then use the geographic sector database as a basis to determine which sector or sectors the mobile station is physically positioned in. The base station controller may then send an HDM to the mobile station, listing as members of the active set only that sector or those sectors in which the mobile station is currently located, as indicated by the geographic position database.

Advantageously, the geographic coverage of sectors as indicated by the geographic sector database, can take into account the strength of signals at various geographic positions (which may be inherently impacted by various considerations, such as topography). That way, when a mobile station is operating at a position that the database indicates is within a particular sector, the signal strength for communication between the base station of that sector and the mobile station at that position can be said to be sufficient. Similarly, if the database indicates that the mobile station position falls within two sectors, the signal strength for communication between the base station of each sector and the mobile station at that position can be said to be sufficient.

According to another aspect of the exemplary embodiment, if the base station controller determines that a mobile station is physically positioned in a number of sectors, the base station controller can select a subset (one or more) of those sectors based on a determination of which sector (i.e., which base station) is closest to the mobile station. The base station controller can then send an HDM to the mobile station, listing that subset of the sectors as the active set.

These as well as other aspects and advantages of the present invention will become apparent to those of ordinary skill in the art by reading the following detailed description, with appropriate reference to the accompanying drawings.

BRIEF DESCRIPTION OF THE DRAWINGS

An exemplary embodiment of the present invention is described herein with reference to the drawings, in which.

DETAILED DESCRIPTION OF AN EXEMPLARY EMBODIMENT

1. Exemplary Wireless Communications Network

Figure 1:
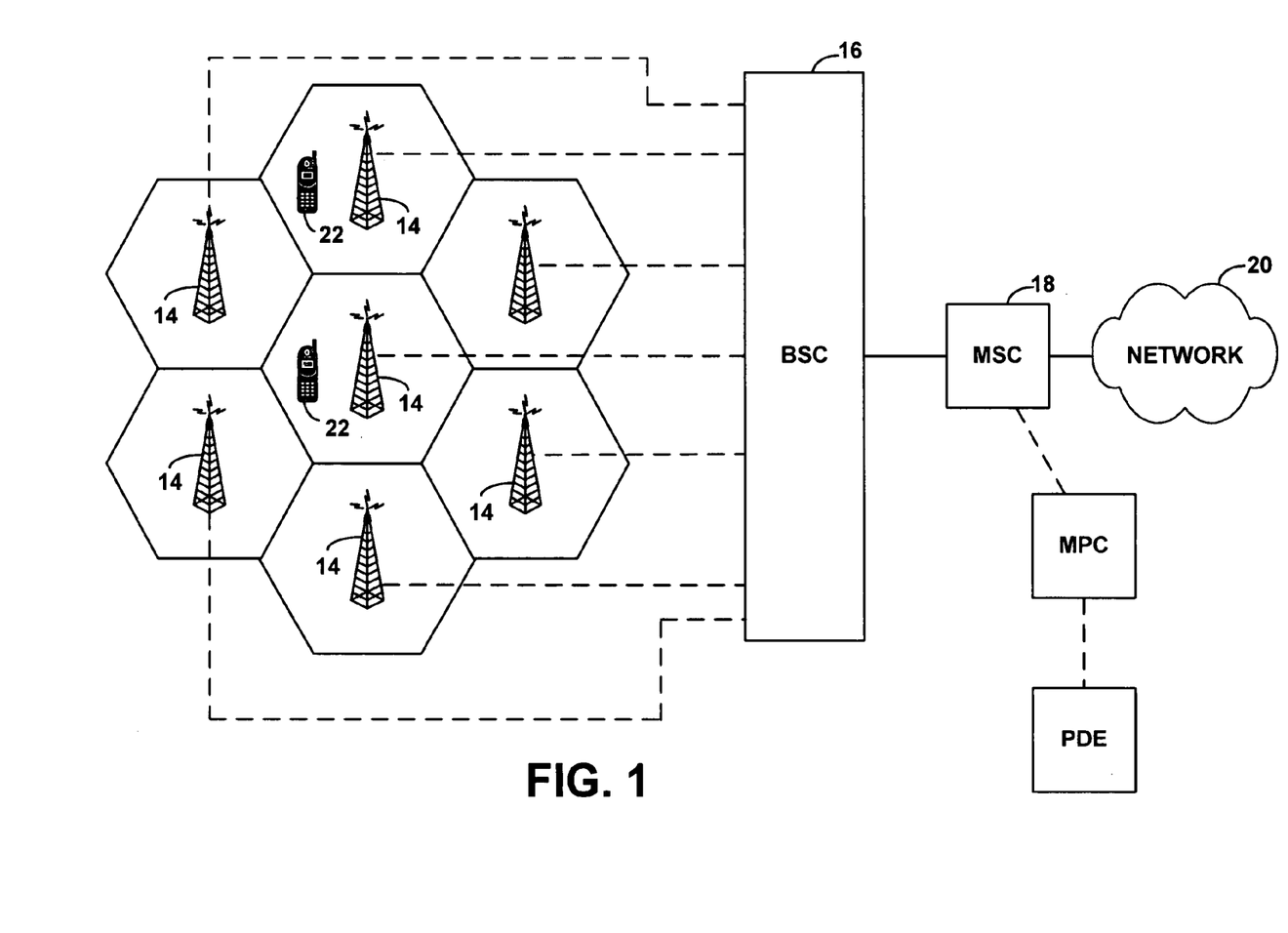
FIG. 1 is a block diagram of a wireless communications network in which the exemplary embodiment can be employed.

Referring to the drawings, FIG. 1 illustrates a simplified block diagram of a wireless communications network 10 in which an exemplary embodiment of the present invention can be employed. It should be understood that this and other arrangements described herein are provided as example only, and other arrangements and other elements (e.g., machines, interfaces, functions, etc.) can be used instead and some elements may be omitted altogether. Further, as in most telecommunications applications, those skilled in the art will appreciate that many of the elements described herein are functional entities that may be implemented as discrete components or in conjunction with other components, in any suitable combination and location.

As shown in FIG. 1, network 10 includes a number of cells or cell sites 12, each of which is defined by an RF radiation pattern from a respective BTS 14. FIG. 1 depicts each of the cells in an idealized fashion, as a hexagon that does not overlap other cells. In reality, however, most cells will overlap with neighboring cells and will vary widely in shape and size.

In network 10, the BTS 14 of each cell site communicates with a BSC 16. In turn, the BSC communicates with an MSC 18. The MSC 18 then communicates with a network 20, such as the PSTN or the Internet for instance. (Alternatively, BSC 16 may be coupled with transport network 20 via a packet data serving node ("PDSN") rather than through MSC 18. Still other arrangements are possible as well.) In operation, a mobile station 22 positioned within a cell site of network 10 can then communicate via an air interface with the BTS and, in turn, with an entity on transport network 22 via BSC 14 and MSC 18.

Typically, the MSC may serve as a general control element for network 10, being responsible for setting up and switching calls to and from the cells, interfacing with the transport network, monitoring traffic to facilitate billing, performing testing and diagnostic services, and performing other network management functions. The BSC, in turn, is usually responsible for managing handoff of signaling and call traffic as a mobile station moves from one cell site to another in network 10, and for controlling power levels and frequency allocations.

Figure 2:
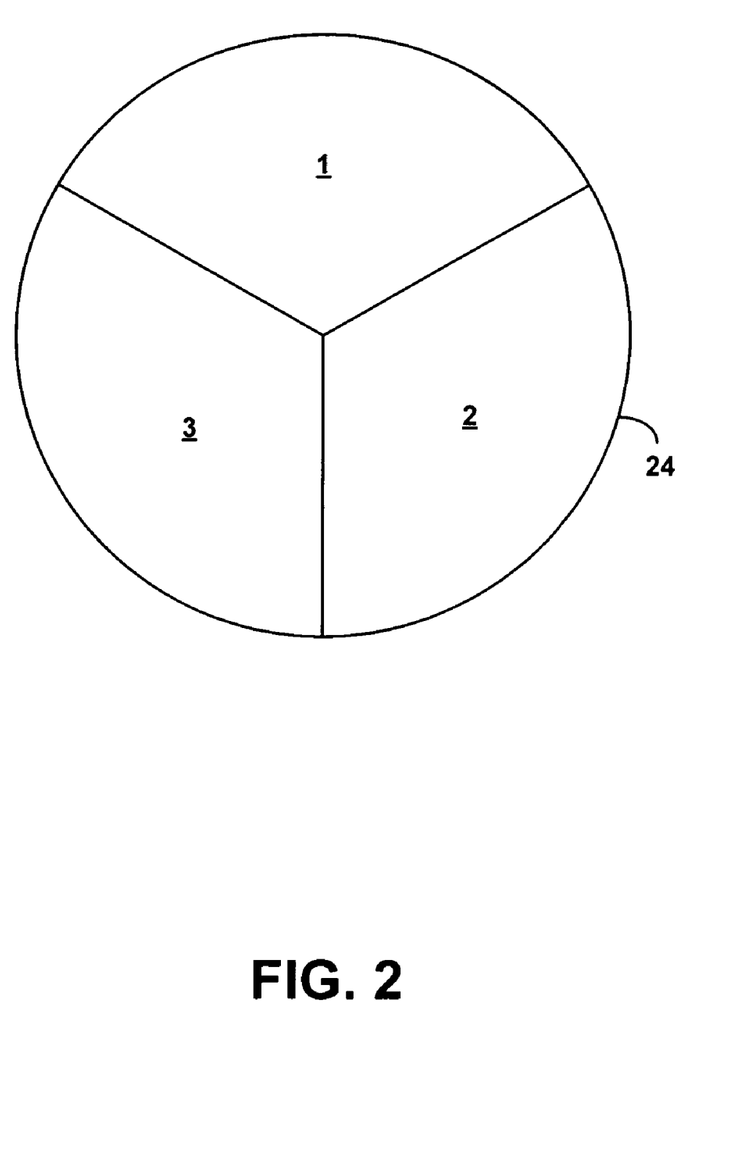
FIG. 2 is an idealized representation of a single cell in a wireless communications network.

As noted above, each cell in a wireless communications network may be subdivided into a number of sectors, typically defined by directional radiation patterns from antenna elements on the BTS. FIG. 2 illustrates one such cell 24, idealized as a circle. Cell 24 is shown subdivided into three sectors 1, 2 and 3, although a cell could have more or fewer sectors. As is typical, the sectors are shown as physically discrete areas. In reality, however, there will likely be some overlap between the sectors even within a given cell.

2. Defining Geographic Coverage of Sectors

Each sector in a wireless communications network will cover a particular geographic area, whether or not contiguous. The geographic coverage area of a given sector can be defined in any desired manner, the details of which are not necessarily critical to this invention.

For purposes of example, the geographic coverage area of a given sector can be considered the area that encompasses all points where a mobile station can usefully communicate with the base station serving the sector. In this regard, a judgement may be made that at least a certain minimum signal strength is required in order to support communication between a mobile station and the base station (to avoid excessive frame error rate, for instance). Therefore, a sector may be said to cover those geographic positions where a mobile station is likely to be able to receive BTS signals of at least the minimum signal strength and/or where the BTS is likely to be able to receive MS signals of at least the minimum signal strength.

Note that the radiation pattern defined by a BTS may in fact extend well beyond what may be considered to be the coverage area of a given sector, since the radiation pattern may extend to areas where the signal strength for communication between a mobile station and the BTS is insufficient. This may occur with distance from the BTS, and as a result of obstructions such as buildings, foliage and land elevation.

3. Establishing a Sector Coverage Database

In accordance with the exemplary embodiment, a BSC (or another entity) will maintain or have access to a database that indicates the geographic coverage of each sector in a given area. For instance, a BSC can maintain in memory (or in another storage medium) a database that indicates the geographic coverage of each sector in the BSC's coverage area (i.e., each sector defined by the BTS's that the BSC controls).

The exemplary database, which may be referred to as a "sector coverage database," can take any of a variety of forms, the details of which are not critical. As an example, the database can include a table in which each record has a "Location" field and a "Sector" field. The Location field can indicate a geographic position (such as latitude/longitude coordinates) or a range of geographic positions (such as a range of latitude/longitude coordinates). The Sector field can then indicate one or more sectors that encompass the location indicated in the Location Field. Each sector can be identified by a BTS identification (BTSID) code and a sector phase (e.g., 1, 2 or 3), or in any other manner desired.

As another example, the database can be arranged relationally, with a "Location" table and a "Sector" table. The Location table can list each geographic position or range of positions in a given area. The Sector table can then list each sector in the area and can include a reference to a geographic position or range in the Location Table. For a position that is encompassed by multiple sectors, multiple records in the Sector table can reference the same position in the Location table. Many other examples are possible as well.

Preferably, the sector coverage database also includes an indication, per sector, of the geographic position where the BTS of the sector resides, i.e., the point of origin (or the approximate point of origin) of the sector. This point of origin can be used to identify which of multiple sectors is closest to a mobile station, so as to further limit a mobile station's active set.

In the exemplary embodiment, the sector coverage database can be populated with values through any of a variety of procedures, the details of which are not critical. Further, the contents of the database can be updated as desired, such as when a substantial change occurs in topography or base station architecture.

By way of example, signal strength measurements can be made at various positions throughout an area. In particular, at a given position, measurements of pilot signal strength (e.g., $E_c/I_o$) may be made periodically for all pilots, such as through use of fixed position or mobile test sets (such as the Remote Mobile Diagnostic System (RmDM) available from Willtech International, Inc. of Santa Ana, Calif., for instance). An average signal strength over time may then be computed for each pilot at that position. If the average signal strength of a given pilot exceeds a particular threshold (such as −13 dB, for instance), that pilot's sector can be said to exist at the given position. And an entry may be made in the sector coverage database, correlating the given position with that sector (i.e., indicating that the sector covers that given position).

In this way, a determination can be made that a given position falls within only one sector, if, at that position, the average signal strength of that sector's pilot over time exceeds the particular threshold, while the average signal strength of each other sector's pilot does not exceed the threshold. Alternatively, a determination may be made that a given position falls within two sectors if the average signal strength of each (of the two) sector's pilot exceeds the threshold, while the average signal strength of each other pilot does not. Further, a determination may be made that a given position falls within three or more sectors in the same way.

As another example, a cellular wireless carrier or other entity can conduct a more automated analysis to produce the sector coverage database (or the data to be held in the database). For instance, the carrier can apply a software package such as Planet DMS2.2 (available from Metapath Software International, London, England, www.msi-world-.com). The Planet system functions to plot the boundaries of sectors, based on signal strength measurements and other factors, and to establish a database that indicates which geographic positions are encompassed by which sectors.

A cellular carrier can input into the Planet system indications of parameters for each sector such as the BTS model, the antenna model, height and azimuth, the BTS power output, the threshold signal levels (e.g., T_ADD and T_DROP) and geographical information such as the latitude and longitude coordinates of buildings and other obstructions in the air interface. And the Planet system can output the BTS signal strength level (e.g., $E_c/I_o$) and handoff boundaries over the geographical plot. Other methods of establishing geographic coverage database may exist as well.

4. Location-Based Selection of Active Set

Figure 3:
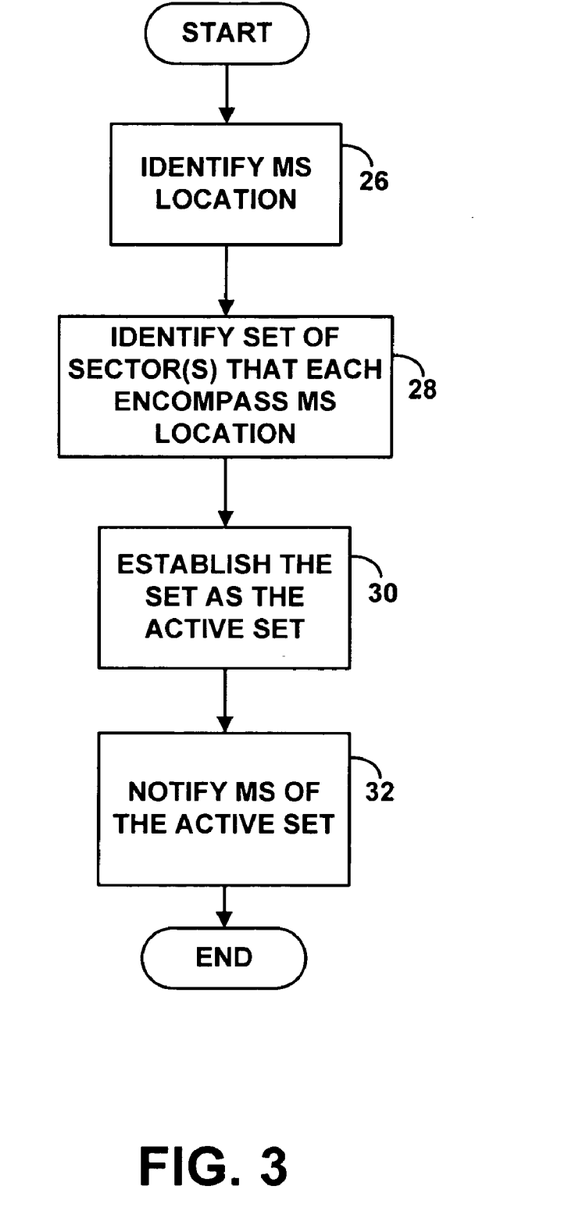
FIG. 3 is a flow chart depicting functions that may be employed in accordance with the exemplary embodiment.

In accordance with the exemplary embodiment, the BSC will use the geographic location of the mobile station to select a sector or sectors to be the mobile station's active set. This process is illustrated generally in FIG. 3. As shown in FIG. 3, at block 26, the BSC identifies the location of a mobile station. At block 28, the BSC then identifies the sector or sectors that encompass the mobile station location. At block 30, the BSC then establishes that sector or those sectors as the mobile station's active set. And, at block 32, the BSC notifies the mobile station of the active set. Preferably, the BSC will perform this process periodically (or continuously) for each mobile station in its service area.

In order to carry out these functions, an exemplary BSC (or other entity) will regularly monitor the location of a given mobile station and, when the BSC detects a change in the mobile station's location, the BSC will responsively consult the sector coverage database to determine which sector or sectors encompass the mobile station's current position. The BSC will then send an HDM to the mobile station, listing that sector or those sectors as members of the mobile station's active set. Further, if the exemplary BSC determines that more than one sector encompasses the position of the mobile station, the BSC may select a subset of those sectors again based on the position of the mobile station.

Figure 4:
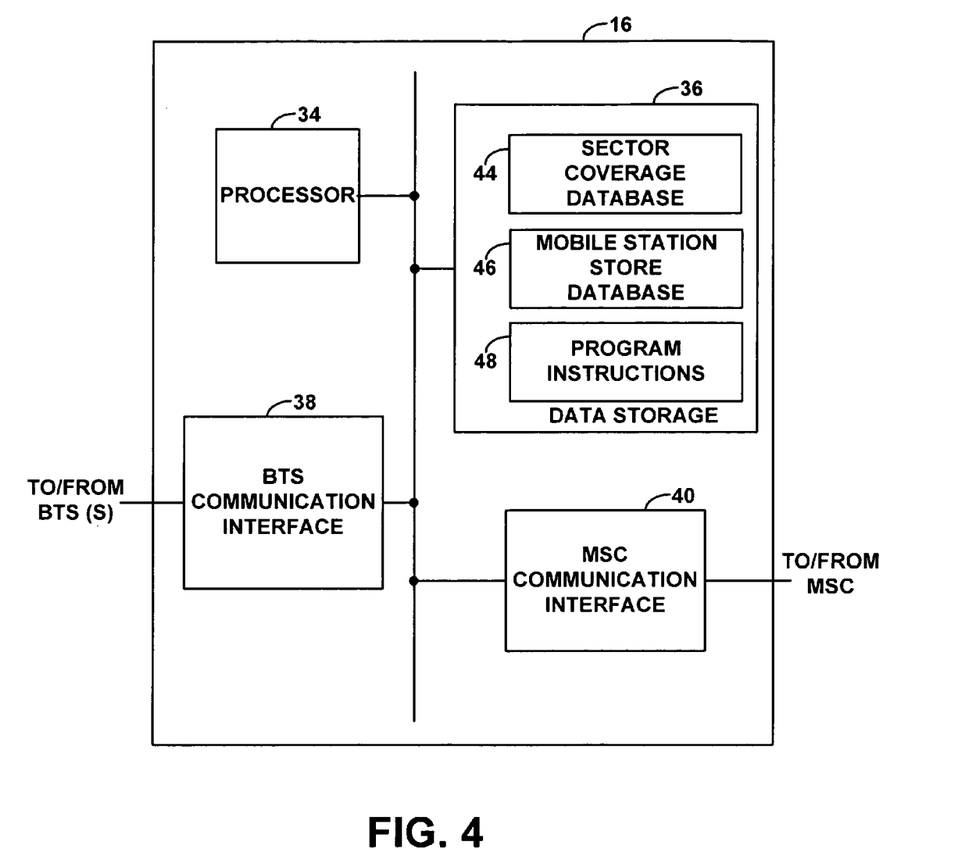
FIG. 4 is a block diagram of an exemplary base station controller.

FIG. 4 is a simplified block diagram of an exemplary BSC 16 arranged to carry out these functions. As shown in FIG. 4, exemplary BSC 16 includes a processor 34, data storage 36, a BTS communication interface 38 and an MSC communication interface 40, all of which may be coupled together by a system bus 42.

In the exemplary embodiment, data storage 36 holds (i) the sector coverage database 44, (ii) a mobile station state table 46, and (iii) program instructions 48. The sector coverage database 44 has been described by way of example above. The mobile station state table 46 preferably functions to maintain a record of the current (latest) location of each mobile station in the BSC's service area, as well as a record of the current active set assigned to the mobile station.

The program instructions 48 are then preferably a set of machine language instructions executable by processor 34 to carry out functions described herein, such as monitoring mobile station location, consulting the sector coverage database 44 to determine which sector or sectors encompass the mobile station's location, establishing an active set, and sending an HDM or other such message to the mobile station (i.e., providing such a message for transmission via the BTS communication interface 38 to the mobile station) in order to specify the mobile station's active set. Alternatively, BSC 16 can include hardware and/or firmware to carry out some or all of these functions.

Figure 5:
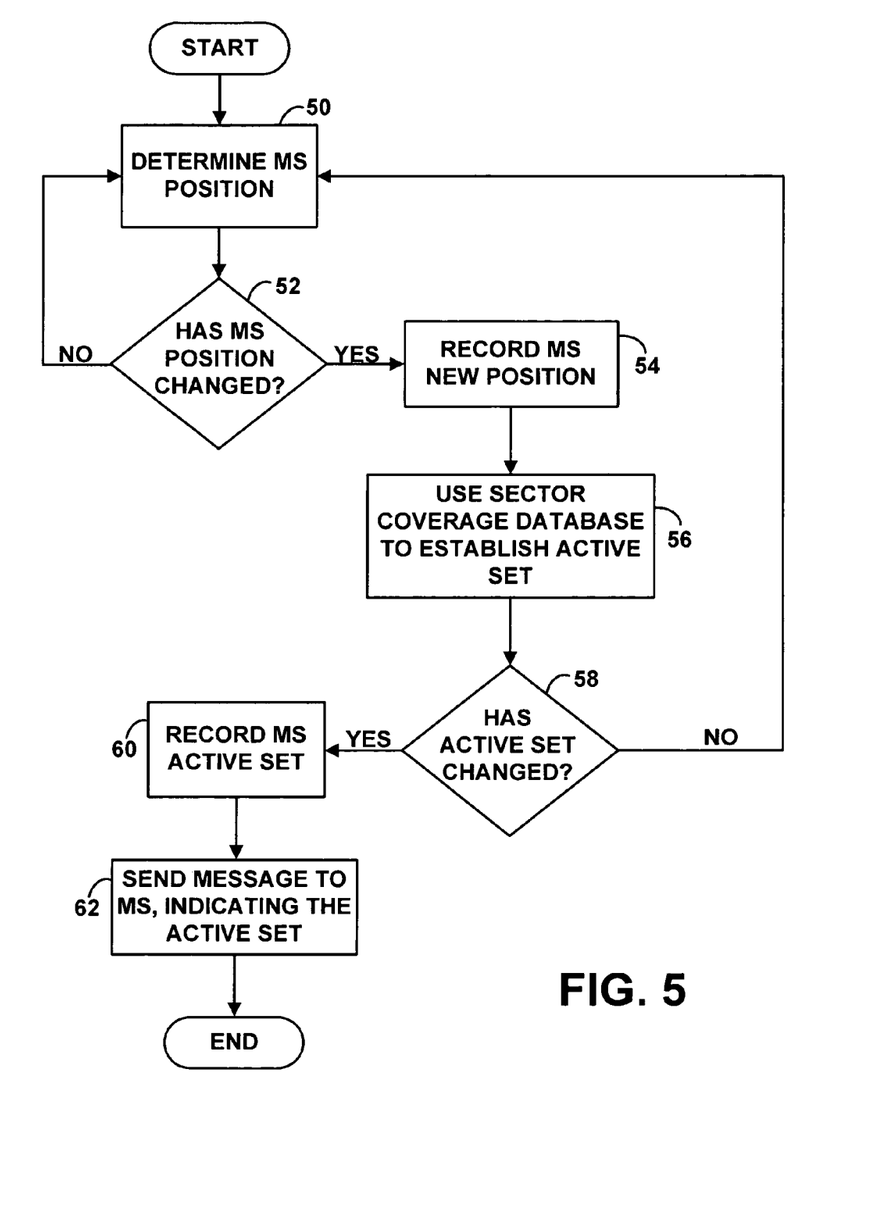
FIG. 5 is another flow chart depicting functions that may be employed in accordance with the exemplary embodiment.

Referring next to FIG. 5, a more detailed flow chart is provided to help illustrate a set of functions performed by BSC 16 in accordance with the exemplary embodiment, for a given mobile station.

As shown in FIG. 5, at block 50, the BSC first determines the physical position of the mobile station. The process of "determining" location can involve simply receiving an indication of location or more actively performing a process to establish the location. In the exemplary embodiment, the BSC may determine mobile station location in any of a variety of ways, preferably employing the latest available location-determining technologies.

For example, if the mobile station is equipped with GPS location-determining technology, the mobile station can determine and report its current location to the BSC, using industry standard messaging (such as that defined by industry standard IS-801 (published in October 1999 as TIA/EIA/ IS-801), for instance). The mobile station may be programmed to regularly (e.g., every 30 ms) report its location and/or the BSC may be programmed to regularly request the mobile station's location and the mobile station may respond accordingly.

As another example, a cellular carrier can employ any of a variety of network-based positioning determining equipment ("PDE") and techniques, such as triangularization for instance, to establish measurements of MS location. The carrier may maintain a record of MS location in a mobile positioning center ("MPC"), and the BSC may query the MPC to identify the location of a given MS. Other examples are possible as well.

The BSC preferably carries out the location determining process periodically or continuously. Each time the BSC determines the mobile station, at block 52, the BSC preferably consults the mobile station state table 46 to determine if the mobile station's position has changed from the last position that the BSC had recorded for the mobile station. If the BSC determines that the position has not changed (or has not changed more than a predefined threshold distance), then processing returns at block 50, where the BSC again determines the mobile station's position. If the BSC determines that the mobile station's position has changed (or has changed sufficiently), then, at block 54, the BSC records the mobile station's current position in the state table 46 and proceeds to block 56.

At block 56, the BSC uses the sector coverage database to establish the mobile station's active set. This process can involve querying the sector coverage database to identify the sector or sectors that encompass the mobile station's current position. The active set can then be said to be that sector or those sectors.

Further, if the BSC determines that two or more sectors encompass the mobile station's current position, those two or more active sectors can be said to define a "proposed active set" or "initial active set." The BSC may then select a subset of the proposed active set to be the active set for the mobile station.

To select a subset of sectors, the BSC can compute the distance between the mobile station's current position and the point of origin of each sector, and the BSC can then select the sector or sectors for which that distance is the shortest (i.e., the sector or sectors to which the mobile station is "closest.") Provided that the mobile station position and the sector point of origin are represented as points having latitude/longitude coordinates, the BSC can readily compute the distance between those points.

Alternatively or additionally, the BSC can consider other factors as a basis to select a subset of the sectors. For instance, the BSC can reference a table that indicates the current level of call traffic per sector and can select as the subset the sector or sectors that currently has the lowest level of call traffic. Commonly, an MSC may maintain such a table. Therefore, the BSC may engage in signaling communication with the MSC to determine which sector has the lowest level of call traffic. Other methods of selecting a subset of sectors are possible as well.

At block 58, the BSC then consults the mobile station state table 46 to determine whether the active set is different from the mobile station's current active set. If the BSC determines that the active set is the same (i.e., the active set has not changed), then processing returns to block 50, where the BSC again determines the mobile station's position. On the other hand, if the BSC determines that the active set has changed, then, at block 60, the BSC records the mobile station's new active set in the state table 46 and proceeds to block 62.

At block 62, the BSC preferably sends a message to the mobile station, notifying the mobile station of the new active set. As described above, this message can be an HDM message, which lists the sectors to be the active set. The message may take other forms as well, provided that the mobile station is arranged to be able to receive and handle the message.

In the exemplary embodiment, the active set established for a given mobile station will include at most two sectors, as compared with the three or six sectors commonly included in an active set under existing procedures. Thus, for instance, the active set may be just one sector, or the active set may be two sectors. Alternatively, however, the active set can be more than two sectors if desired.

Figure 6:
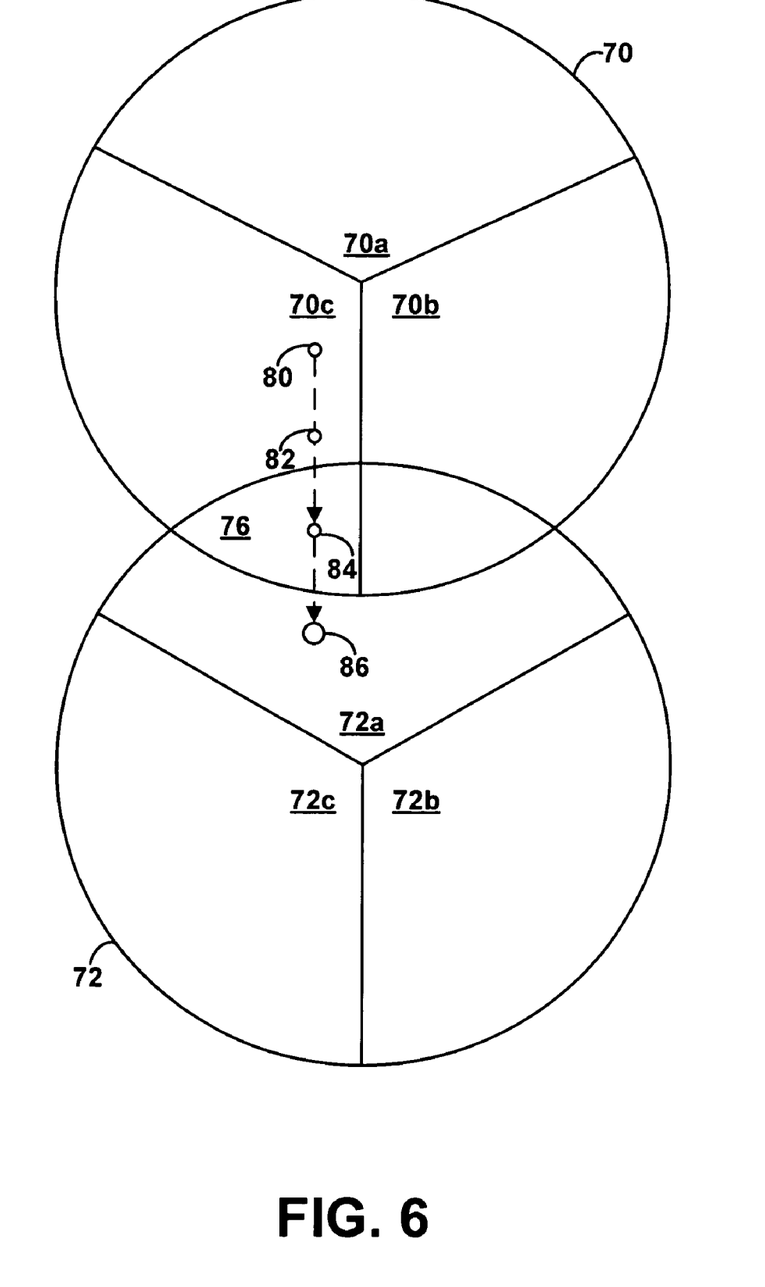
FIG. 6 is an idealized representation of an arrangement of two cells in which the exemplary embodiment can be advantageously employed.

Referring next to FIG. 6, an arrangement of two cells is shown, to help illustrate some examples location-based selection of active-set. FIG. 6 illustrates two cells 70 and 72. By way of example, cell 70 is shown to include sectors 70*a*, 70*b* and 70*c*, and cell 72 is shown to include sectors 72*a*, 72*b* and 72*c*. The boundaries of the cells and sectors shown in FIG. 6 are representative of boundaries that may be established in the sector coverage database as described above, although the boundaries are shown in idealized form for purposes of illustration. Further, each cell is served by a respective BTS (not shown), and both BTSs are controlled by a common BSC (not shown).

A mobile station may be located within a given one of these sectors and may be communicating with the BTS of the respective cell, in either idle or active mode. A user may then move the mobile station toward an area of overlap and then fully into a new physical sector. For instance, if a mobile station is located in physical sector 70*c* and is moving south, the mobile station will approach the area of overlap designated in FIG. 6 by reference numeral 76, will then enter area 76, and will then move fully into sector 74*a*. This trajectory is shown by dashed line 78 in FIG. 6, as the mobile station moves from position 80 to position 82 to position 84 and finally to position 86.

When the mobile station is located at position 80, the BSC may consult the sector coverage database and may determine that the only sector currently encompassing the mobile station's location is sector 70*c*. Consequently, the BSC may send an HDM to the mobile station, listing only that sector as the mobile station's active set.

As the mobile station moves to position 82, the BSC may determine that the mobile station's position has changed. However, after querying the sector coverage database, the BSC may determine that the location-based active set has not changed, so the BSC may opt to not send an HDM to the mobile station.

As the mobile station then moves over the boundary of cell 72 into sector 72*a*, the BSC may determine that the mobile station's position has changed once again. This time, upon querying the sector coverage database, the BSC may determine that the both sector 70*c* and sector 72*a* encompass the mobile station's current position. Consequently, the BSC may send an HDM to the mobile station, listing those two sectors as the mobile station's active set.

Alternatively, the BSC may then determine that the mobile station is positioned closer to sector 72*a* than to sector 70*c* (i.e., the mobile station is closer to the BTS of sector 72*a* than to the BTS of sector 70*c*), so the BSC may establish as the active set only sector 72*a*. The BSC may then send an HDM to the mobile station, listing only sector 72*a* as the mobile station's active set.

In turn, as the mobile station crosses over the boundary of cell 70 and fully exits the geographic coverage of sector 70*c*, the BSC may determine that the mobile station's position has again changed. Upon querying the sector coverage database, the BSC may then determine that only sector 72*a* encompasses the mobile station's current position. Therefore (if the current active set included both sectors 70*c* and 72*a*, for instance), the BSC may send an HDM to the mobile station, listing only sector 72*a* as the active set.

5. Conclusion

An exemplary embodiment of the present invention has been described above. Those skilled in the art will understand, however, that changes and modifications may be made to this embodiment without departing from the true scope and spirit of the present invention, which is defined by the claims.

For example, although the foregoing describes carrying out various functions in a BSC, some or all of the functions can be carried out in one or more other entities instead. For instance, an MPC or location server can be programmed to track the location of a mobile station and to signal to the BSC when the mobile station's location changes. Alternatively, various functions can be carried out in an MSC or other entity. Other examples are possible as well.

We claim:

1. A method of establishing an active set for a mobile station operating in a cellular wireless system, the method comprising:
   determining a current physical position of the mobile station;
   identifying a grout of sectors that each encompass the determined current physical position of the mobile station;
   computing a distance respectively between the determined current physical position of the mobile station and each sector of the group; and
   selecting as the active set a subset of the group of sectors, at least in part by selecting from the group one or more sectors for which the computed distance is shortest.

2. The method of claim 1, further comprising:
   sending an indication of the active set to the mobile station.

3. The method of claim 2, wherein determining the current physical position of the mobile station comprises:
   receiving a signal from the mobile station indicating the mobile station position.

4. The method of claim 2, wherein determining the current physical position of the mobile station comprises:
   querying a mobile positioning center to obtain an indication of the current physical position of the mobile station.

5. The method of claim 2, wherein identifying the group of sectors that each encompass the determined current physical position of the mobile station comprises:
   querying a sector coverage database to identify the group of sectors.

6. The method of claim 2, wherein the subset of the group of sectors consists of only one sector.

7. The method of claim 2, wherein the subset of active sectors consists of only two sectors.

8. The method of claim 2, wherein sending an indication of the active set to the mobile station comprises:
   sending a Handoff Direction Message (HDM) to the mobile station, the HDM including the indication of the active set.

9. A soft handoff method comprising:
   repeatedly performing the method of claim 2 as the mobile station moves from a first position to a second position,
   wherein the group of sectors when the mobile station is at the first position is different than the group of sectors when the mobile station is at the second position.

10. A soft handoff method comprising:
performing the method of claim 2 when the mobile station is at a first position, thereby establishing a first active set; and
performing the method of claim 2 when the mobile station has moved from the first position to a second position, thereby establishing a second active set different than the first active set.

11. A method comprising:
periodically performing the method of claim 2.

12. A method of establishing an active set for a mobile station operating in a cellular wireless system, the method comprising:
determining a current physical position of the mobile station;
querying a sector coverage database to identify a plurality of sectors that each encompass the determined current physical position;
determining, respectively for each sector of the identified plurality of sectors, a distance between the sector and the determined current physical position of the mobile station;
selecting from the plurality of sectors at most two sectors having the shortest determined distance, the at most two sectors defining an active set; and
sending to the mobile station an indication of the active set.

13. A system for establishing an active set for a mobile station operating in a cellular wireless system, the system comprising:
means for determining current a physical position of the mobile station;
means for identifying a group of sectors that each encompass the determined current physical position of the mobile station, each sector of the group having a respective point of origin;
means for computing a distance respectively between the determined current physical position of the mobile station and the point of origin of each sector in the group;
means for selecting as the active set a subset of the group of sectors, at least in part by selecting from the group one or more sectors for which the computed distance is shortest; and
means for providing an indication of the active set for transmission to the mobile station.

14. A system for establishing an active set for a mobile station operating in a cellular wireless system, the system comprising:
a processor;
data storage;
program instructions stored in the data storage and executable by the processor to cause the processor (i) to determine a current physical position of the mobile station, (ii) to identify a group of sectors that each encompass the determined current physical position of the mobile station, each sector of the group having a respective point of origin, (iii) to compute a distance respectively between the determined current physical position of the mobile station and the point of origin of each sector in the group, (iv) to select as the active set a subset of the group of sectors, at least in part by selecting from the group one or more sectors for which the computed distance is shortest, and (v) to provide an indication of the active set for transmission to the mobile station.

* * * * *

UNITED STATES PATENT AND TRADEMARK OFFICE
CERTIFICATE OF CORRECTION

| | | |
|---|---|---|
| PATENT NO. | : 7,092,722 B1 | Page 1 of 1 |
| APPLICATION NO. | : 09/915731 | |
| DATED | : August 15, 2006 | |
| INVENTOR(S) | : Dae-Sik Oh et al. | |

It is certified that error appears in the above-identified patent and that said Letters Patent is hereby corrected as shown below:

Column 10, Line 26, "grout" should read --group--

Signed and Sealed this
Twenty-first Day of June, 2011

David J. Kappos
*Director of the United States Patent and Trademark Office*